United States Patent Office 3,778,478
Patented Dec. 11, 1973

3,778,478
PROCESS FOR PREPARING POLYTHIODIGLYCOL
Eugene R. Bertozzi, Yardley, Pa., assignor to Thiokol Chemical Corporation, Bristol, Pa.
No Drawing. Filed May 12, 1972, Ser. No. 252,693
Int. Cl. C07c *149/12*
U.S. Cl. 260—608    6 Claims

ABSTRACT OF THE DISCLOSURE

A process for preparing polythiodiglycols directly from monoepoxides, $H_2S$, and sulfur using water or the polythiodiglycol itself as the reaction medium either with or without an inorganic base catalyst according to the following reaction is disclosed.

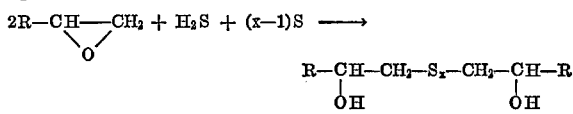

BACKGROUND OF THE INVENTION

Field of the invention

This invention relates to a novel process for preparing polythiodiglycols directly from monoepoxides, hydrogen sulfide, and sulfur using water or the polythiodiglycol itself as the reaction medium both with and without an inorganic base catalyst. The reaction is as follows:

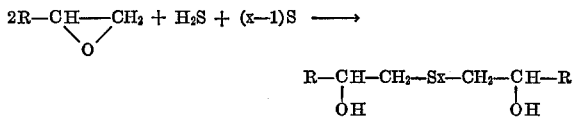

wherein R is H, alkyl radicals, aryl radicals, and aralkyl radicals.

Description of the prior art

While a variety of art-known processes for preparing polythiodiglycols are presently being used, there are still extant problems in the production of the polythiodiglycols particularly dealing the separation of unwanted byproducts.

Particularly, U.S. 2,527,378 to the instant inventor produces the polythiodiglycols from the reaction of the epoxide with alkaline polysulfide. This reaction produces unwanted alkaline hydroxide byproduct which must be removed to yield the desired polythiodiglycol.

U.S. 2,754,333 further progessed the art by disclosing the formation of dithiodiglycol from epoxides, hydrogen sulfide, and an aqueous solution of an alkali thiosulfate. This process results in byproduct alkali thiosulfate and alkali sulfite which must be removed to yield the desired product.

Both of these patents disclose the recycling of the byproducts to yield the theoretical reaction of:

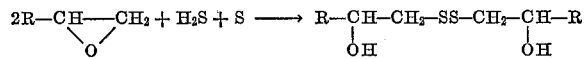

However, this reaction was unworkable as such until German Pat. 1,093,790 wherein the above reaction was performed directly. This patent required catalytic action from basic catalysts such as triethylamine, piperidine, or alkali hydroxides, and also organic diluents were required including hydrocarbons (benzene), ether, or dioxan.

SUMMARY OF THE INVENTION

In direct contrast to the above patents, this invention enables the production of polythiodiglycols directly from the epoxide, hydrogen sulfide, and sulfur in a solvent of either water or the particular polythiodiglycol which is sought to be produced.

Additionally, the reaction may be carried out either with an inorganic basic catalyst or with no catalyst whatsoever, thereby indicating a marked variation from the prior art.

DESCRIPTION OF THE PREFERRED EMBODIMENTS

The suitable epoxides for this invention are of the formula

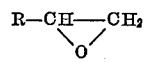

wherein R is H, an alkyl radical, an aryl radical or an aralkyl radical. The simplest of these is ethylene oxide wherein R is H. Other common expoxides which are suitable include propylene oxide ($R=CH_3$), butylene oxide ($R=CH_3CH_2-$), pentylene oxide ($R=CH_3CH_2CH_2-$), styrene oxide

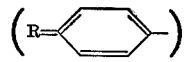

methylstyrene oxide

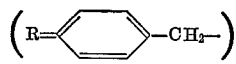

cyclohexene oxide

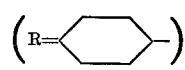

epichlorohydrin ($R=CH_2Cl$) and any other compound containing the epoxide ring structure.

When a catalyst is used any inorganic basic catalyst is suitable including, but not limited to, alkali hydroxides, alkali hydrosulfides, alkali sulfides, and alkali carbonates, such as NaOH, $Na_2S$, $Na_2S_x$, $Ca(OH)_2$, KOH, $K_2S$, $K_2S_x$, and NaSH.

A major advantage of this process is the use as a solvent of merely water, which is easily removed, or the polythiodiglycol which is sought to be produced, thereby requiring no purification operation.

A particularly advantageous process results from the use of polythiodiglycol as the solvent catalyst.

When a catalyst is used in this process, the reaction may be carried out at about room temperature (20° C.) or above, advantageously at about 40°–100° C., though higher temperatures could be used.

When no catalyst is included in the reaction mixture, then the temperature of the reaction must be higher, i.e., above 40° C., and preferably from about 65°–120° C., though again higher temperatures could be used, but no appreciable advantage is gained by running the reaction over 120° C.

The polythiodiglycols of this invention may have a sulfur rank of anywhere from 1 to 6, predominantly 2.0 to 2.5. By rank is meant the average number of sulfur atoms at each sulfur bond within each molecule, thereby accounting for a rank value which may not be a whole number.

The compounds of this process are useful as chemical intermediates, and in the manufacture of dyes, pharmaceutical products, plant dusting agents, and as plasticizers or additives to gasoline and oil.

The following examples are intended to be merely illustrative of the invention and not in limitation thereof.

EXAMPLE 1

This example illustrates the reaction of ethylene oxide with $H_2S$ and S, wherein the solvent was water and the catalyst NaSH.

To a 1000 ml. stirred resin flask (equipped with a sparger for ethylene oxide and a sparger for $H_2S$, a condenser, the top of which led to a trap containing 10% NaOH, to catch any escaping H₂S) was added 500 g. water, 1 g. 70% NaSH, and 40 g. powdered sulfur. The mixture was heated to 50° C. and over a period of 3 hours, 93 g. of ethylene oxide and 34 g. of H₂S were fed in through the sparger. Slight cooling was required to keep the temperature at about 50° C. The sulfur gradually dissolved during the period so that at the end only a slightly yellow solution remained. The total increase in weight of the solution was practically equal to the weight of H₂S plus the ethylene oxide added. No weight increase was observed in the NaOH trap to catch unreacted H₂S. The mixture had a pH of about 10. About 1.6 g. of concentrated H₂SO₄ were added to bring the pH to a stable pH of 6. The solution was heated in a still under partial vacuum using a packed column to reduce entrainment until the pot temperature reached 100° C. The vacuum was increased to about 6 mm. Hg pressure and the pot temperature maintained at 100° C. for 2 hours. The dried, slightly cloudy product was a very light straw color and weighed 163 g. (theory=162 g.). Its infrared spectrogram matched that of dithiodiglycol. Its refractive index was 1.57 compared to 1.56 for the strict disulfide. In this case enough sulfur was used to give a sulfur rank of 2.25 instead of a strict disulfide. The OH value of the product was 20.05% (theory=20.6% for 2.25 rank). Sulfur content was 41.71% (theory=44.4%); SH content=0.02%.

EXAMPLE 2

In this example, the reaction was carried out in dithiodiglycol itself as the solvent and reaction medium. Thus, no final water removal was required. To the resin flask, equipped as above, was added 400 g. of dithiodiglycol, 2 g. NaSH (70% flake), 160 g. sulfur and the stirred mixture heated to 55° C. Simultaneously over a 7 hour period, 356 g. of ethylene oxide and 139 g. of H₂S were metered in. The temperature was kept at 55°–60° C. The total weight of the product was 1,053 g. (compared to 1,057 g. which is the sum of all the above ingredients). The color was straw-colored. A slight H₂S odor persisted so 20 g. more of ethylene oxide was added. This caused the H₂S odor to disappear and the color to lighten. The mercaptan content was 2% before the addition of the 20 g. of ethylene oxide, and only 0.06% after this addition. The pH of the mixture was brought to pH 6 by the addition of 2.8 g. of concentrated H₂SO₄.

The infrared spectra of the products from both of the above examples were indistinguishable from that of dithiodiglycol produced from the classical ethylene chlorohydrin-Na₂S₂ process. Both products were completely soluble in water indicating very little sulfur rank beyond 2.00.

EXAMPLE 3

This example was run with no inorganic basic catalyst or any other catalyst whatsoever, and in water as the solvent.

To 500 grams of water was added 40 g. of sulfur. The mixture was agitated and heated to 80° C. About 2 mols of ethylene oxide gas (actually 99 grams) and 1 mol of H₂S gas (actually 34 grams) were passed simultaneously and gradually into the agitated mixture of water and sulfur over a period of 1 hour. Slight cooling was required to maintain the temperature between 80 and 90° C. After about 10 minutes from the start, the sulfur began to dissolve and it became completely dissolved after about 40 minutes. At the end, the mixture was completely homogeneous; that is, no oil layer was evident. The product had an H₂S odor so a small quantity of additional ethylene oxide was added causing the odor to disappear and the product to give a negative test to sulfide with lead acetate paper. Thus the actual ethylene oxide was 99 grams. Before the addition of this small quantity of ethylene oxide, the pH was about 7. After the addition of the ethylene oxide, the pH was about 8. Approximately 0.5 gram of sulfuric acid was added to bring the pH down to 6 again. After distilling off the water by going to 10 mm. Hg vacuum at 100° C., a very pale straw-colored product weighing 163 grams resulted which was completely water soluble. Its analyses were very close to that of dithiodiglycol. Sulfur content was 42.6%, OH content was 21.0%,and SH was 0%.

EXAMPLE 4

This example was performed with no catalyst whatsoever and in dithiodiglycol solvent medium.

Four hundred (400) grams of dithiodiglycol were added to a 2 liter glass vessel. To it was added 240 g. (7.5 moles) of powdered sulfur. The mixture was heated to 80° C. with stirring. In about 20 minutes all the sulfur was dissolved. Then 12.1 mols (531 g.) of ethylene oxide and 6.06 mols (206 g.) of H₂S were passed into this solution gradually over a period of 6 hours. Slight cooling was required to keep the temperature between 80 and 90° C. Complete absorption of the ethylene oxide and H₂S was achieved. The very pale straw-colored product had a pH of 5 and also a slight odor of H₂S. Because of this, about 12 grams of ethylene oxide were added which removed not only the odor but also eliminated the sulfide test according to lead acetate paper. At this point the product had a pH of about 8. Three (3) grams of sulfuric acid were required to neutralize the product. The product was almost completely soluble in water. A slight haze remained in the water when about 1 g. of the product was shaken up with 5 cc. of water. The sulfur content was 42.5% and the OH content was 20.0%. Total weight of product was 1,361 grams, including the original 400 grams used to start the reaction. Thus 961 grams of dithiodiglycol were produced. Theoretical yield for a rank of 2.25=970 grams.

EXAMPLE 5

The preparation of polythiodipropylene glycol was shown by the following using the procedure of Example 3. 40 grams (1.25 moles) of sulfur slurried in 500 grams of water were charged to a one liter reaction flask and heated to 80° C. 116.2 grams (2.0 moles) of propylene oxide and 34.0 grams (1 mole) of H₂S were fed to the reactor over a one hour period. The propylene oxide was fed as a liquid at about 1.94 g./min. and the H₂S gas at 0.57 g./min. The reaction mixture was held at 80–87° C. initially by heating, and then by cooling as an exotherm occurred. The product consisted of 102 grams of a yellow water insoluble liquid and 27.0 grams of a very light yellow water soluble liquid.

The chemical analysis of the water insoluble material showed 47.06% S and 15.04% —OH. This amount of sulfur would correspond to product of rank 3.29. Such a product of rank 3.29 would have a theoretical —OH of 14.72%, which corresponds closely to the actual value found.

The chemical analysis of the water soluble material showed 34.89% S and 19.04% —OH. This amount of sulfur would correspond to a product of rank 1.98. Such a product of rank 1.98 would have a theoretical —OH of 18.08%, which corresponds closely to the actual value found.

EXAMPLE 6

A polythiodiglycol was prepared from epichlorohydrin using the procedure of Example 3 and the following.

40.0 grams (1.25 moles) of sulfur and 500 grams of water were charged to a one liter reaction flask and heated to 80° C. 185 grams (2 moles) of epichlorohydrin and 34 grams (1 mole) of H₂S were added over a one hour period. The epichlorohydrin was fed as a liquid from a dropping funnel at a rate of about 3.08 g./minute. The H₂S gas was fed at 0.57 g./minute; pot temperature during the run was 79–87° C. Initially heat was required, then cooling as an exotherm occurred. The final product consisted of 162 grams of dark yellow water insoluble liquid and 41 grams of very light yellow water soluble liquid.

The chemical analysis of the water insoluble material showed 35.3% S, 23.92% Cl, and 11% —OH. This amount of sulfur would correspond to a product having rank 3.19 which would correspond to a 11.8% —OH and 24.55% Cl, both of which were close to the actual values found.

The chemical analysis of the water soluble material 7.7% S, 29.34% Cl, and 23.0% —OH. The high hydroxyl and low sulfur content of this material indicates that part of the epichlorohydrin was hydrolyzed to form the glycol. Therefore, assuming that a disulfide was formed from the sulfur, this product would contain 30% disulfide and 70% hydrolyzed epichlorohydrin. The —OH content of such a mixture calculates to 25.66% which is close to the actual found, thereby indicating agreement with the assumption. The Cl content of the mixture calculates to 30.90%, also close to the actual result discovered.

EXAMPLE 7

Polythiodiphenyl glycol was prepared from styrene oxide using the procedure of Example 3 and the following.

40.0 grams (1.25 moles) of sulfur and 500 grams of water were charged to the one liter reaction flask and heated to 85° C. 240.3 grams (2 moles) of styrene oxide and 34 grams (1 mole) of $H_2S$ were fed to the reactor simultaneously over a one hour period. The styrene oxide was added from a feed funnel at a rate of about 4 grams/minute. The $H_2S$ gas was added at 0.57 gram/minute. The pot temperature during the one hour period was 81–93° C. No exotherm occurred. 312.0 grams of material out of 314.3 grams charged were accounted for at the end of the reaction. 25.0 grams of lost material were collected in the Barrett NaOH trap in the effluent stream. 13.0 grams of unreacted sulfur were collected by filtration. The product consisted of 212.0 grams of a water insoluble material and 62.0 grams of water soluble product which was recovered by distilling off the water. The soluble material was a tan wax-like solid at room temperature and the insoluble product was a partially crystallized reddish-pink semi-solid.

The chemical analysis of the water insoluble material showed 18.65% S and 12.6% —OH. This amount of sulfur would correspond to a product with rank 1.73 which would contain 11.4% —OH. The actual value found was quite close to the theoretical value.

The chemical analysis of the water soluble material showed 0.0% S and 23.7% —OH. The total lack of sulfur indicated that the styrene oxide must have hydrolyzed to form phenylethylene glycol which has a theoretical —OH content of 24.6%.

EXAMPLE 8

The procedures of the preceding four examples, exclusive of temperatures, could be followed, depending upon the solvent and catalyst selected, to produce polythiodiglycols from the following expoxides:

| Epoxide | Solvent | Catalyst | Temperature, °C. |
|---|---|---|---|
| Propylene oxide | Dithiodipropylene glycol | NaOH | 60 |
| Styrene oxide | Dithiodiphenyl glycol | None | 75 |
| Cyclohexene oxide | Dithiodicyclohexene glycol | None | 95 |
| Ethylene oxide | Dithiodiglycol | Ca(OH)$_2$ | 25 |
| Do | Water | None | 40 |

EXAMPLE 9

High rank polythiodiglycol was prepared using the basic procedures of Examples 1 and 2 in water as the solvent medium. Sufficient sulfur was charged to produce a rank 4 product, but in both cases the reactions resulted in an aqueous layer, a water-insoluble layer, and an unreacted sulfur layer. The aqueous layer, 31–42% of the product formed, was found to be about rank 2.25, while the water-insoluble layer corresponded to a product of rank 3.4–3.5. The results, along with the reaction conditions, are summarized in Table I. These results show that the above-mentioned ranked products were formed.

TABLE I.—RESULTS OF EXAMPLE 9

|  | A | B |
|---|---|---|
| Sulfur charged, g | 96 | 96 |
| Ethylene oxide charged, g | 92 | 88 |
| H$_2$S charged, g | 39 | 39 |
| Catalyst | None | (1) |
| Temperature, °C | 84–86 | 50–61 |
| Solvent | (2) | (2) |
| Yield of water-insoluble product, g | 131 | 146 |
| Percent: |  |  |
| SH | 0.02 | 0.02 |
| C | 23.41 | 24.20 |
| H | 4.78 | 5.53 |
| S |  | 54.64 |
| OH | 14.51 | 17.01 |
| Yield of water-soluble product, g | 93 | 67 |
| Percent: |  |  |
| SH | 0.016 | 0.01 |
| C | 29.84 |  |
| H | 6.85 |  |
| S | 43.15 |  |
| OH | 21.62 |  |

[1] 1 g, NaSH.
[2] Water.

While the above examples disclose batch operations, the use of a continuous process for the production of the polythiodiglycol is within the scope of this disclosure.

What is claimed is:

1. A process for producing polythiodiglycols by reacting a monoepoxide, hydrogen sulfide, and sulfur at a temperature of above about 40° C. and in a solvent selected from the group consisting of water and the polythiodiglycol.

2. The process of claim 1 wherein the monoepoxide is selected from the group consisting of alkyl oxides, aryl oxides, and aralkyl oxides.

3. The process of claim 1 wherein the monoepoxide is selected from the group consisting of ethylene oxide, propylene oxide, butylene oxide, styrene oxide, cyclohexene oxide, and epichlorohydrin.

4. The process of claim 1 wherein the monoepoxide is ethylene oxide.

5. The process of claim 1 wherein the solvent is water and the temperature is above 75° C.

6. The process of claim 1 wherein the solvent is the polythiodiglycol and the temperature is above 65° C.

References Cited

UNITED STATES PATENTS 3,064,056  11/1962  Ebersberger et al. ____ 260—608

FOREIGN PATENTS

| 389,590 | 8/1959 | Switzerland | 260—608 |
| 1,093,790 | 9/1958 | Germany | 260—608 |
| 915,334 | 7/1954 | Germany | 260—608 |
| 918,927 | 10/1954 | Germany | 260—608 |
| 64/19,783 | 12/1964 | Japan | 260—609 A |

LEWIS GOTTS, Primary Examiner

D. R. PHILLIPS, Assistant Examiner